Oct. 8, 1929.  A. F. SHIRREFF  1,730,480
VEHICLE
Filed Jan. 5, 1925  3 Sheets-Sheet 2
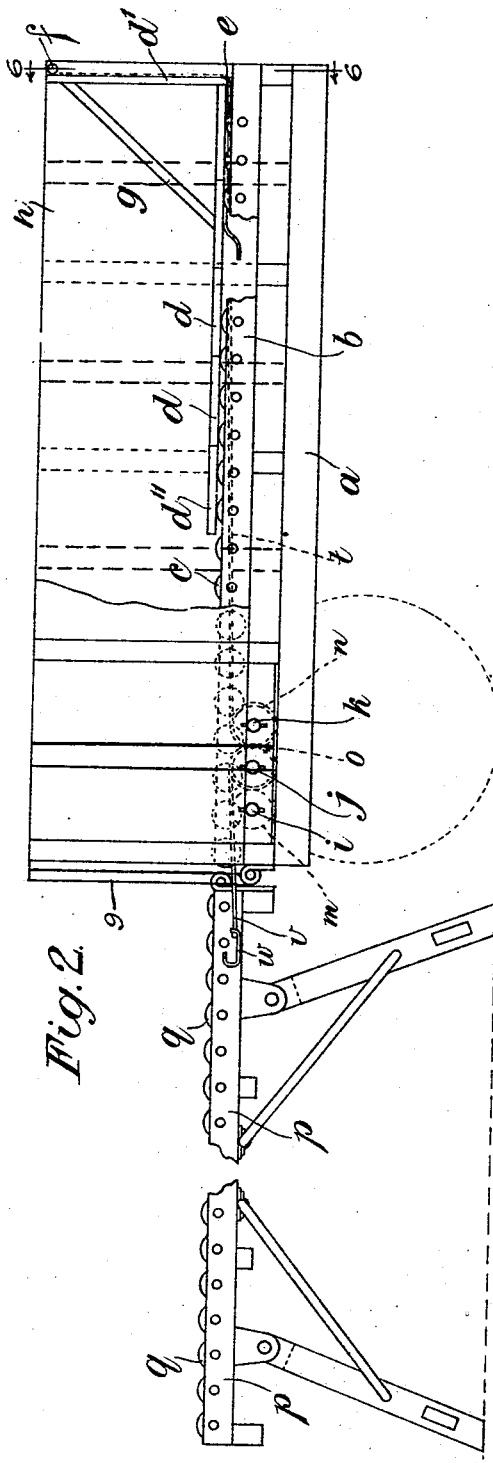
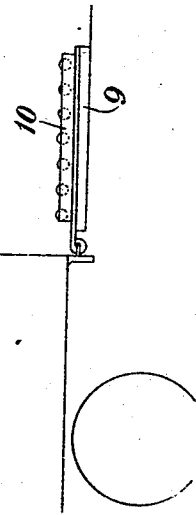
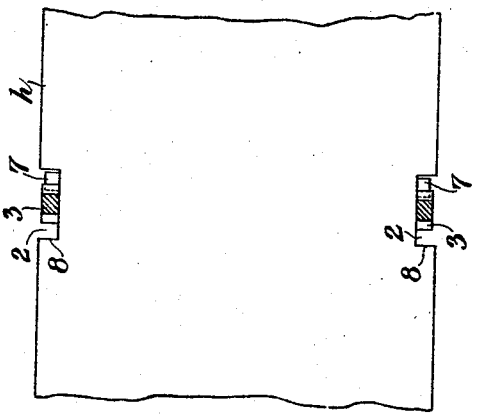
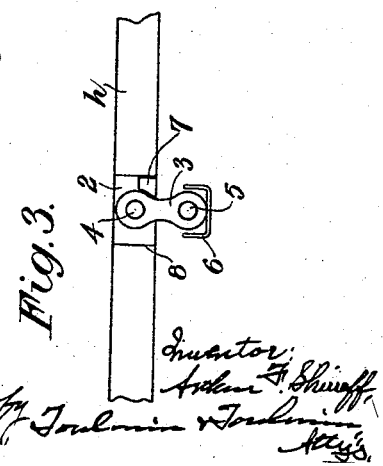

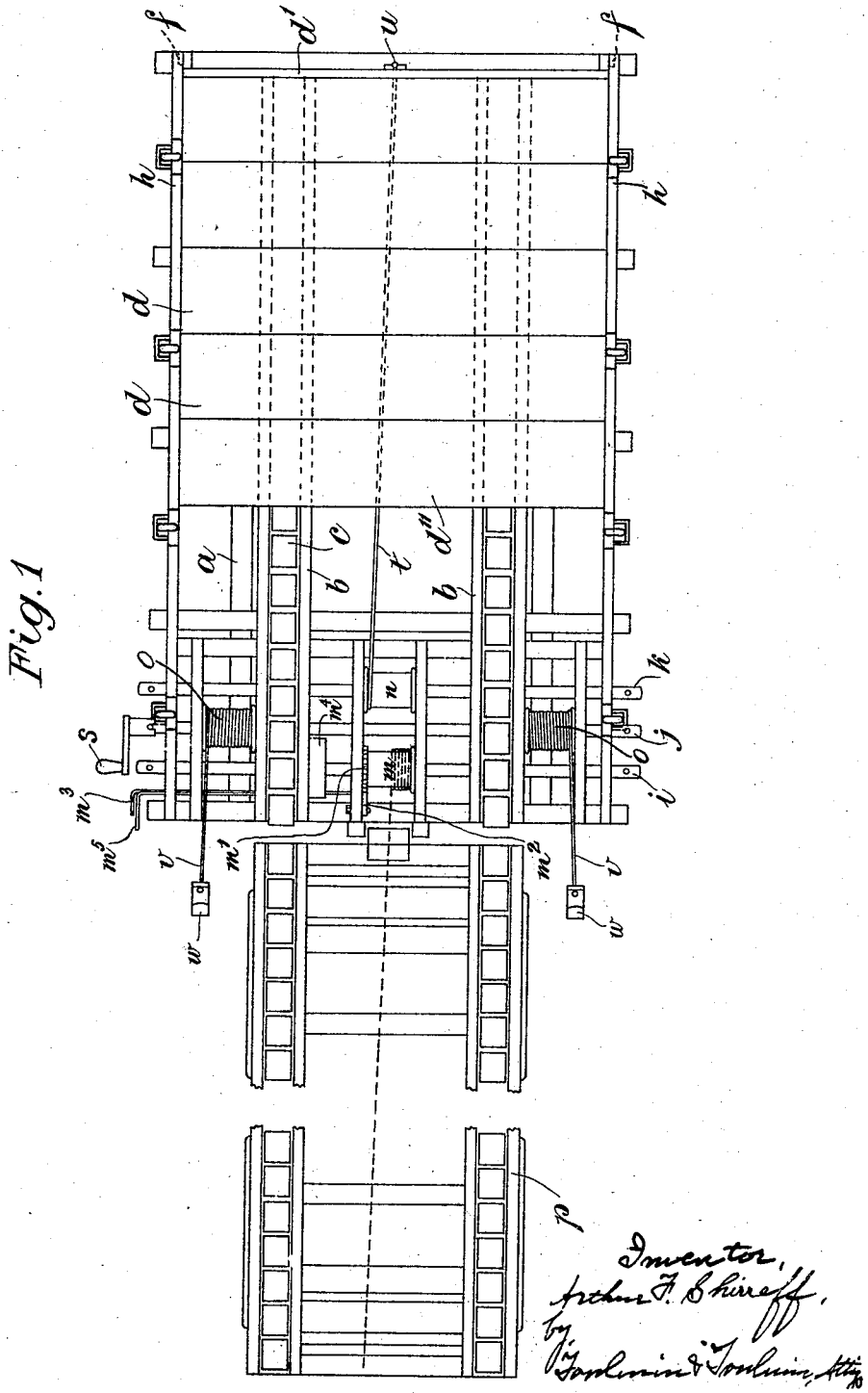

Oct. 8, 1929. A. F. SHIRREFF 1,730,480
VEHICLE
Filed Jan. 5, 1925 3 Sheets-Sheet 3
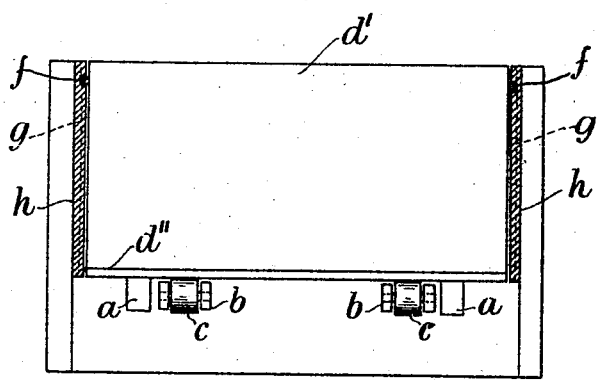
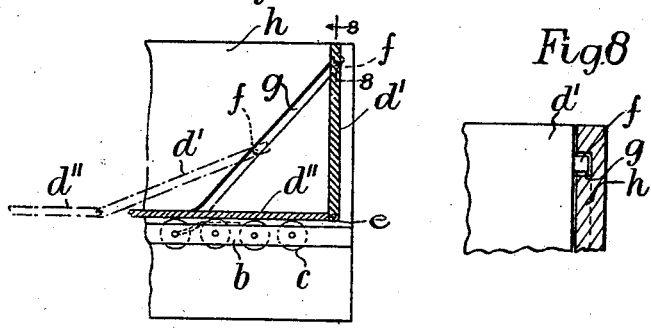
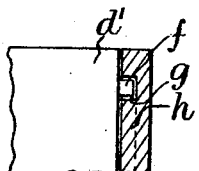
Inventor
Arthur F. Shirreff,
By Toulmin & Toulmin
Attorneys Patented Oct. 8, 1929

1,730,480

UNITED STATES PATENT OFFICE

ARTHUR FORBES SHIRREFF, OF LONDON, ENGLAND

VEHICLE

Application filed January 5, 1925, Serial No. 652, and in Great Britain January 8, 1924.

The object of this invention is to provide an improved vehicle.

A vehicle made in accordance with this invention comprises a body on the vehicle frame, a sliding floor to said body and means for sliding said floor relatively to the body.

As further features of my invention I may employ slanting or curved members in the side boards of the body on which one or more of the floor boards can run to form the front board or boards of the vehicle, a floor composed of separate boards and means for automatically diminishing friction between the load and the vehicle walls when unloading by giving lateral motion to the walls.

Referring to the drawings:—

Fig. 1 illustrates in plan one form of device made in accordance with this invention, as applied for example to a lorry, and Fig. 2 illustrates a part sectional elevation thereof.

Figs. 3 and 4 illustrate modifications of detail in elevation and plan;

Fig. 5 illustrates further modification of detail.

Fig. 6 is a vertical section on the line 6—6 of Fig. 2 and looking in the direction of the arrows.

Fig. 7 is a detail view of the front portion of the lorry showing different positions of the end board.

Fig. 8 is a sectional view taken on the line 8—8 of Fig. 7.

In Figures 1 and 2 of the drawings the lorry frame $a$ is provided with two longitudinal runways $b$ of roller bearings $c$ on which rest the separate boards $d, d'\ d''$ which form the floor of the lorry. The end board $d'$ is rounded at one edge $e$ and has trunnions $f$ adapted to run in slanting guides $g$ in the side boards $h$ of the body, so that the board $d'$ can run up the guides $g$ and form the front board of the lorry. At the rear end of the lorry the frame has three transverse shafts $i, j, k$ of which shafts $i$ and $k$ have each medial winding drums $m, n$ secured to them; drum $m$ has a ratchet and pawl $m', m^2$ controlled by the rod $m^3$; and is provided with a hand brake $m^4$ actuated by handle $m^5$; and shaft $j$ has end winding drums $o$ secured to it. An attachable platform $p$ with roller runways $q$ is provided and adapted to lie close up to the lorry, and to be raised into a vertical position relative thereto by a cord, when the cord is wound on to drum $m$ by shaft $i$ and handle $s$, which is transferable from one shaft to another. From drum $n$ runs cord $t$ terminating in hook $u$ which fastens on to the front end board $d'$ of the floor and serves, when drum $n$ is wound up by its shaft $k$ and handle, to pull and slide the floor of the lorry over the rollers onto platform $p$. From drums $o$ run cords $v$ which are secured to the rear end board $d'$ of the floor, by hooks $w$ and serve to pull and slide the floor back to the lorry body, when drums $o$ are wound up by shaft $j$ and handle.

In operation, supposing it is required to unload the lorry, platform $p$ is drawn up to the lorry and lowered from its upstanding position by rotating the drum and the floor slides then on the runways $b$ onto the runways $q$ of platform $p$. The load can be handled as required. The floor is then slidden back to the body by winding cord $v$ on drum $o$ and end board $d'$ runs up the guides $g$ to form the front board.

Platform $p$ may be fixed in any required position if required or at times it may be raised into an upright position at the back of the vehicle for transport therewith or it may be dispensed with.

In Figures 3 and 4 of the drawings is illustrated one form of device adapted to relieve the friction of the sides against the load when the latter is being unloaded. In the form shewn the sides $h$ of the lorry are provided at suitable, preferably regular, corresponding intervals, with recesses or slots 2 in which links 3 are pivoted at one end on pins 4. The other ends of the links are pivoted on pins 5 in channel shaped vertical stanchions 6 secured at suitable intervals to the lorry $a$. At one side of the slots or recesses 2 stops 7 are provided to limit the angular movement of the links 3. The sides $h$ are adapted to slide in or on the frame of the lorry; and the stanchions are so disposed with regard to the sides that when the latter are in their normal position the links are perpendicular to the sides.

When the movable floor of the lorry is run out for unloading, any friction that may exist between the load and the sides of the lorry causes the sides to tend to move parallel with the load and consequently to be moved by links 3 parallel to themselves outwards on their pivots away from the load and thus relieve the friction. The degree of movement in this direction of the sides $h$ is limited by the sides 8 of slots or recesses 2. After unloading, sides $h$ are pushed back to their normal position and their degree of movement in this direction is limited by the stops 7.

In Figure 5 is illustrated a modified form of tail board 9 of the lorry, designed for use when the ramp, on to which unloading is to take place, is above or below the tail of the lorry frame, or the platform $p$ is not used. The board 9 is provided with a roller frame 10, along which the floor of the lorry can slide onto the ramp across the intervening space. The position of the board 9 is indicated in broken line in Fig. 1, to show how it is closed up when not in use. The forms of tail board $p$ and 9 should not usually be simultaneously employed on the same vehicle.

What I claim and desire to secure by Letters Patent is:

A vehicle comprising a body on the vehicle frame, said body having a sliding floor and side walls, said floor including a plurality of separate boards, members in the side walls of the body on which the floor can run to form the end wall of the vehicle, and means for sliding the floor relatively to the body.

In testimony whereof, I affix my signature.

ARTHUR FORBES SHIRREFF.